US012625328B2

(12) United States Patent
Nakanelua et al.

(10) Patent No.: US 12,625,328 B2
(45) Date of Patent: May 12, 2026

(54) ACTIVITY DETECTION IN FIBER OPTIC NETWORK

(71) Applicant: CyberSecure Innovations, LLC, Prince Frederick, MD (US)

(72) Inventors: Bobby Nakanelua, Elizabethtown, KY (US); Stephen Sohn, Cummings, GA (US); Scott Rye, Prince Frederick, MD (US)

(73) Assignee: CyberSecure Innovations, LLC, Prince Frederick, MD (US)

( * ) Notice: Subject to any disclaimer, the term of this patent is extended or adjusted under 35 U.S.C. 154(b) by 464 days.

(21) Appl. No.: 18/364,454

(22) Filed: Aug. 2, 2023

(65) Prior Publication Data

US 2025/0044528 A1 Feb. 6, 2025

(51) Int. Cl.
*G02B 6/42* (2006.01)
*H04B 10/071* (2013.01)
(52) U.S. Cl.
CPC ......... *G02B 6/4201* (2013.01); *H04B 10/071* (2013.01)

(58) Field of Classification Search
CPC .................................................. H04B 10/071
See application file for complete search history.

(56) References Cited

U.S. PATENT DOCUMENTS

| | | | |
|---|---|---|---|
| 2013/0169445 A1* | 7/2013 | Carralero ............. | G01D 5/3538 250/353 |
| 2020/0032645 A1* | 1/2020 | LeBlanc ................. | E21B 47/06 |
| 2020/0362692 A1* | 11/2020 | Ellmauthaler ......... | G01V 1/208 |
| 2023/0388012 A1* | 11/2023 | Brenne .................. | G01V 1/226 |
| 2025/0044528 A1* | 2/2025 | Nakanelua ........... | H04B 10/071 |

* cited by examiner

*Primary Examiner* — Rhonda S Peace
(74) *Attorney, Agent, or Firm* — Foley & Lardner LLP

(57) ABSTRACT

In some embodiments, local intensity extrema at different wavelengths of a wavelength range reflected across a first cable of a first mode may be determined, the wavelength range being reflected by a second cable of a second mode different from the first mode. Reference locations for sampling windows of the wavelength range may be determined based on the local intensity extrema. A signal reflected across a cable of the first mode may be monitored based on the reference locations for the sampling windows. An activity related to the cable may be detected via a prediction model and based on the monitoring.

20 Claims, 10 Drawing Sheets

212

Original reading (30x30 grid)

Scaled reading (15x15 grid)

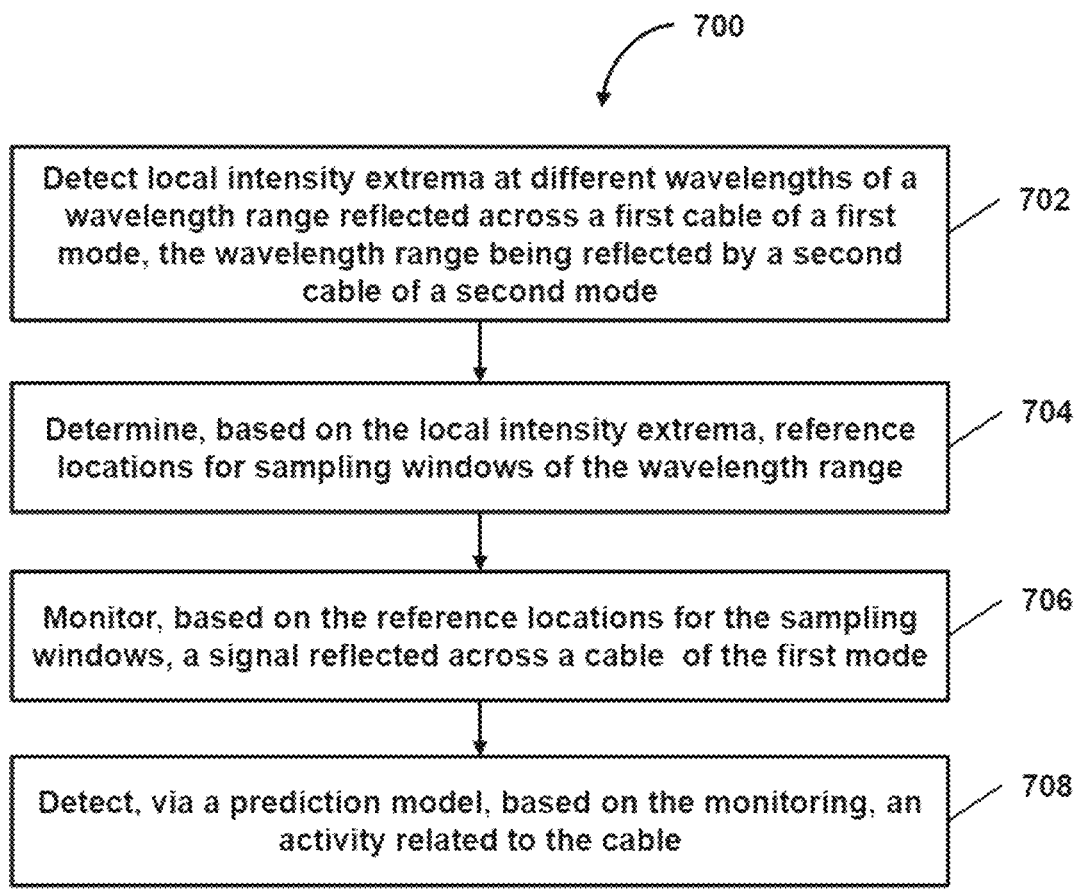

700

Detect local intensity extrema at different wavelengths of a wavelength range reflected across a first cable of a first mode, the wavelength range being reflected by a second cable of a second mode — 702

Determine, based on the local intensity extrema, reference locations for sampling windows of the wavelength range — 704

Monitor, based on the reference locations for the sampling windows, a signal reflected across a cable of the first mode — 706

Detect, via a prediction model, based on the monitoring, an activity related to the cable — 708

ACTIVITY DETECTION IN FIBER OPTIC NETWORK

SUMMARY

Methods and systems are described herein for improvements related to detection of activities based on monitoring cable signals (e.g., selected portions of light reflected by a remote termination unit and across a fiber optic cable). With respect to existing light-based activity detection systems, for example, activity detection is generally performed by monitoring electrical signals from components such as photodiodes (e.g., the detector component) to measure the intensity of a light source (e.g., a laser source) and output an electronic signal related to the measurement. In the context of intrusion detection, such existing systems will typically measure laser signal strength, Fresnel reflections, and Rayleigh backscatter either directly from the signal or from a reflected laser signal. Such existing systems, however, typically require specialized and complex hardware (e.g., Fabry-Pérot (FP) lasers, precise pulse generators, etc.,) to do so that are costly or introduce other constraints (e.g., distributed acoustic sensing has limited dynamic range).

To address one or more of the foregoing issues, in some embodiments, a remote termination unit (RTU) including a multi-mode fiber optic cable may be employed by passively coupling the RTU to a fiber optic cable to be monitored (e.g., at an end of the fiber optic cable). As an example, as a laser signal travels through the multi-mode cable of the RTU, the multi-mode cable causes dispersion of the laser signal, and much of this dispersed laser signal is reflected back from the multi-mode cable through the monitored cable. In one use case, an interrogator (e.g., fiber optic interrogator, a fiber optic controller, etc.) may detect the reflected laser. In this way, for example, due to the dispersion caused by the multi-mode cable, activity directed at or in a vicinity of the fiber optic cable causes a detectable change in the detected laser without necessarily requiring one or more specialized and complex hardware (e.g., without requiring the use of a distributed system of Fiber Bragg grating (FBG) sensors, FP lasers, precise pulse generators, etc.).

In some embodiments, selected portions of a wavelength range of the reflected laser, instead of the entire wavelength range detected by the interrogator, may be monitored. As an example, during a calibration phase, calibration intensity peaks may be detected at different wavelengths of a wavelength range reflected by the multi-mode fiber optic cable of the RTU and across the single-mode fiber optic cable. Based on the calibration intensity peaks, reference locations for sampling windows of the wavelength range may be determined. Each window of the sampling windows may include a corresponding wavelength of an intensity peak of the calibration intensity peaks. Additionally, or alternatively, the sampling windows collectively may not include other wavelengths of the wavelength range between respective ones of the sampling windows of the wavelength range. In some embodiments, at least two windows of the sampling windows may span different numbers of wavelengths than each other.

In some embodiments, monitoring for one or more activities of the fiber optic cable may be performed by monitoring, based on the reference locations for the sampling windows, light reflected across the fiber optic cable during one or more time periods of an operation phase without monitoring the other wavelengths of the wavelength range during such time periods, thereby reducing computation resource usage or processing time (and, thus, increasing the efficiency of the system). Based on the monitoring, the activities (e.g., a disturbance event related to the fiber optic cable) may be detected via a prediction model. Spectral features of reflected light may depend on or relate to characteristics of components in a light path that the light traverses. Such components may include, for example, a specific RTU (e.g., having a multi-mode fiber optic cable with a specific core size, material, or length), a specific fiber optic cable to be monitored, a specific fiber interrogator, or other components.

In some embodiments, instead of a dedicated prediction model for each combination of these components of such a monitoring system, a light signal reflected by an RTU and detected by a fiber interrogator may be processed such that the processed signal may be analyzed using a common prediction model (e.g., by scaling or performing other normalization techniques on the reflected light signal), thereby increasing the versatility of the prediction model of the system. Additional, or alternatively, parameters employed in monitoring may be adjusted based on specific applications (e.g., specific fiber optic cables to be monitored, specific RTUs, or fiber interrogators to be used), feedback from prior monitoring, user instructions, or other information, thereby allowing adaptation or improvement of the system.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 7 shows a flowchart of a method of facilitating activity detection, in accordance with one or more embodiments.

Like reference numerals denote like components or operations. The drawings are not to scale.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
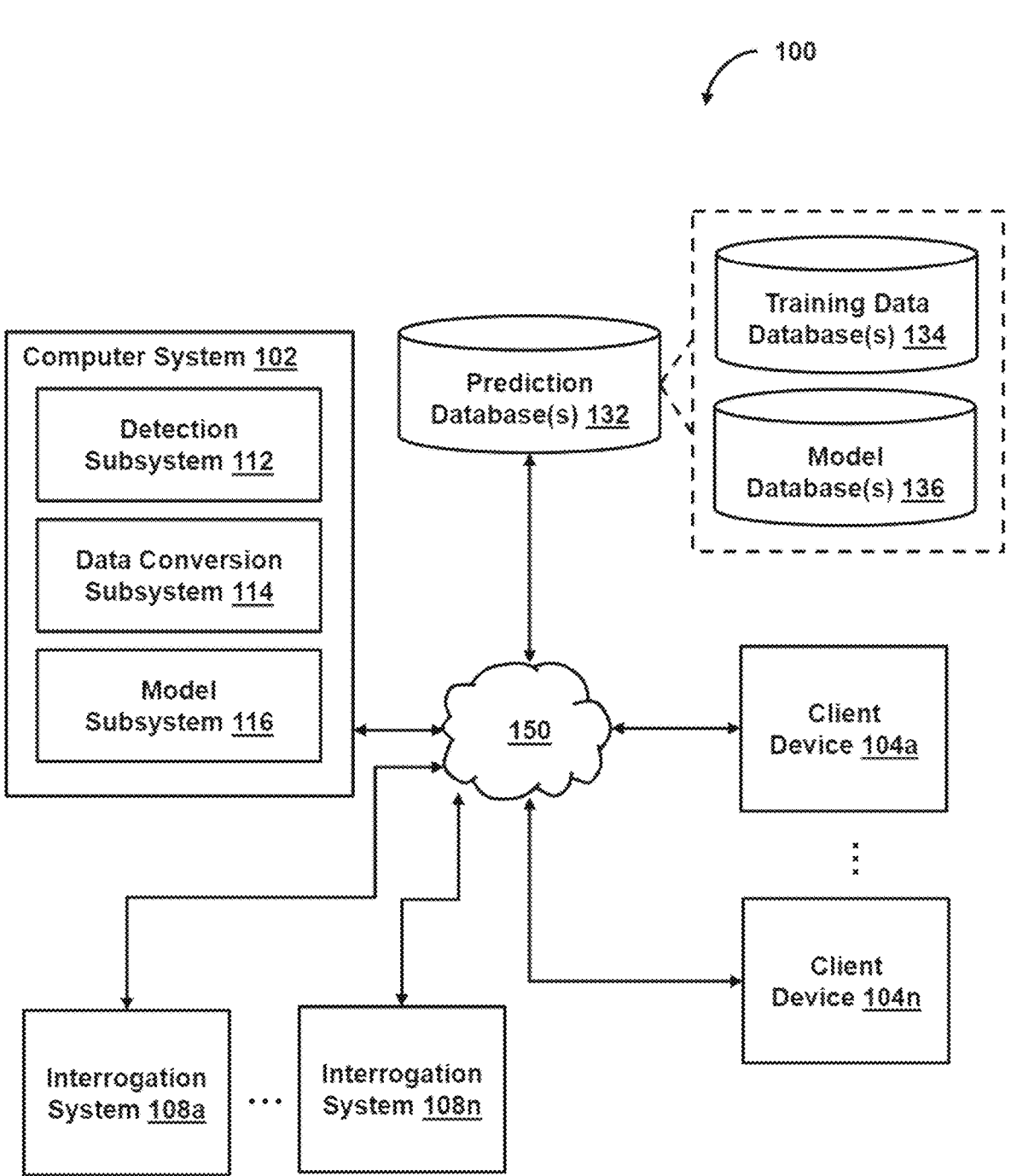
FIG. 1 shows a system for facilitating activity detection via reflected light, in accordance with one or more embodiments.

FIG. 1 shows a system 100 for facilitating activity detection via reflected light, in accordance with one or more embodiments. As shown in FIG. 1, system 100 may include computer system 102, client device 104 (or client devices 104*a*-104*n*), or other components. Computer system 102 may include detection subsystem 112, data conversion subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, many existing light-based activity detection systems perform activity detection by monitoring electrical signals from components such as photodiodes (e.g., the detector component) to measure the intensity of a light source (e.g., a laser source) and output an electronic signal related to the measurement. In the context of intrusion detection, such existing systems will typically measure laser signal strength, Fresnel reflections, and Rayleigh backscatter either directly from the signal or from reflected laser signal. Such existing systems, however, typically require specialized and complex hardware (e.g., FBG sensors, FP lasers, precise pulse generators, etc.) to do so that are costly or introduce other constraints (e.g., distributed acoustic sensing has limited dynamic range). For example, an FBG sensor may typically respond to a change in strain, movement, and temperature of the sensor. However, the "range" within which an FBG sensor can detect movement or strain is limited to several feet surrounding the sensor (e.g., 10 ft on either side of the FBG), and the range for temperature monitoring using an FBS sensor may be even shorter.

In some embodiments, system 100 may perform activity detection by monitoring light (e.g., laser or other light from a fiber optic cable or other physical transmission line) reflected by an RTU and across a fiber optic cable. The RTU may include a cable of a different mode than the fiber optic cable. As an example, the RTU may be a multi-mode cable, while the fiber optic cable being monitored may be a single-mode cable. Light coming from the single-mode cable may bounce around in the multi-mode cable and be reflected back into the single-mode cable, which in turn may be captured by a fiber optic sensor interrogation device. While multi-mode cables are not designed to be used as a reflector because multi-mode cables cause optical signals to become dispersed as they travel along the cable (e.g., which may cause signal distortion and loss of signal quality), the seemingly "negative" effects of the signal dispersion (e.g., signal distortion, loss of signal quality, etc.) also cause any changes to or around the vicinity of the single-mode cable or its connected components to become highly detectable by components of system 100. In this way, for example, signals so captured may be used to detect changes in the laser coming from the fiber optic cable without necessarily requiring one or more specialized and complex hardware (e.g., without requiring the use of FBG sensors, FP lasers, precise pulse generators, etc.).

Spectrum data captured by the interrogator may include a multi-dimensional array of data based on the wavelength range being monitored, thereby taking a large amount of memory or storage. To address such issues, in some embodiments, system 100 may perform activity detection by monitoring selected portions of a wavelength range of the reflected light, instead of the entire wavelength range. As an example, during a calibration phase, calibration intensity peaks may be detected at different wavelengths of a wavelength range reflected by the multi-mode fiber optic cable of the RTU and across the single-mode fiber optic cable. Based on the calibration intensity peaks, reference locations for sampling windows of the wavelength range may be determined. As an example, for each of the sampling windows, the reference locations may include a starting point (e.g., a starting wavelength) and an endpoint (e.g., an end wavelength) of the sampling window. Each of the sampling windows may include a corresponding wavelength of an intensity peak of the calibration intensity peaks. The sampling windows collectively may omit other wavelengths of the wavelength range between respective ones of the sampling windows of the wavelength range. Subsequently, light reflected across the fiber optic cable during an operation phase may be monitored based on the reference locations for the sampling windows, while omitting the other wavelengths of the wavelength range, thereby reducing computation resource usage or processing time (and, thus, increasing the efficiency of the system). Based on the monitoring, one or more activities related to the fiber optic cable may be detected via one or more machine learning models or other prediction models.

As discussed, spectral features of reflected light may depend on or relate to characteristics of components in a light path that the light traverses (e.g., the core size, material, or length of the multi-mode fiber optic cable of the RTU), a specific fiber optic cable to be monitored, a specific fiber interrogator, or other components. A specific combination of these components configured for monitoring a fiber optic cable may correspond to a specific combination of spectral features of the reflected light. However, in some embodiments, instead of a dedicated prediction model for each combination of these components of a monitoring system, a light signal reflected by an RTU and detected by a fiber interrogator may be processed such that the processed signal may be analyzed using a common prediction model (e.g., by scaling or performing other normalization techniques on the reflected light signal), thereby increasing the versatility of the prediction model of the system.

In some embodiments, based on the activity detection, system 100 may perform one or more actions related to a physical transmission line. In some embodiments, system 100 may cause shutdown of network dataflow to one or more network endpoints based on the activity detection. As an example, in response to a detected disturbance on the physical information transmission line, system 100 may initiate shutdown of the network data flow to the network endpoints proximate to the detected disturbance. In one scenario, the initiation of the shutdown of the network data flow may include transmitting a port disabling command to a data flow control switch to disable a port associated with the network endpoints, rerouting at least a portion of the network data flow to avoid the network endpoints, or other actions. In some embodiments, system 100 may generate one or more alarms or other notifications based on the activity detection.

Subsystems 112-116

In some embodiments, detection subsystem 112 may analyze a light signal. The light may be captured by a sensor. As an example, the captured light may be light that is reflected by an RTU and across a fiber optic cable or other light carrier or emitter (e.g., used as part of a physical transmission line or other system). In one scenario, detection subsystem 112 may analyze a light signal captured by interrogation system 108 as illustrated in FIGS. 2A-2D.

Figure 2A:
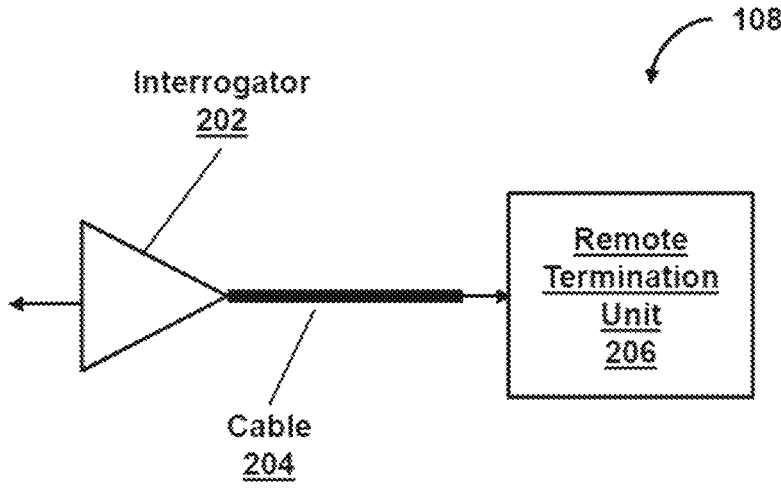
FIGS. 2A-2F show arrangements of components of an interrogation device for facilitating activity detection, in accordance with one or more embodiments.

As illustrated in FIG. 2A, interrogation system 108 may include interrogator 202, cable 204, and remote termination unit (RTU) 206. Interrogator 202 may be configured to detect light signals. As an example, interrogator 202 may detect a light signal from cable 204 and output data (e.g., spectral data representing a relationship between signal amplitudes and wavelengths at different times or other data) to one or more processing units (e.g., one or more processing units in detection subsystem 112, one or more processing units in data conversion system 114, etc.). The detected data may be presented in the form illustrated in FIGS. 3A-3D, in which the horizontal axis is the wavelengths of a detected light signal (in nanometers (nm)), and the vertical axis is the power or amplitude of the detected light signal (in decibel-milliwatts (dBm)). As illustrated, the effect of the RTU on a reflected light signal may be random or based on one or more parameters (e.g., the length of the multi-mode fiber in the RTU, other intrinsic or extrinsic parameters of the cable in the RTU, the overall state of the fiber optic cable to be monitored, etc.), as discussed elsewhere herein).

Figure 3A:
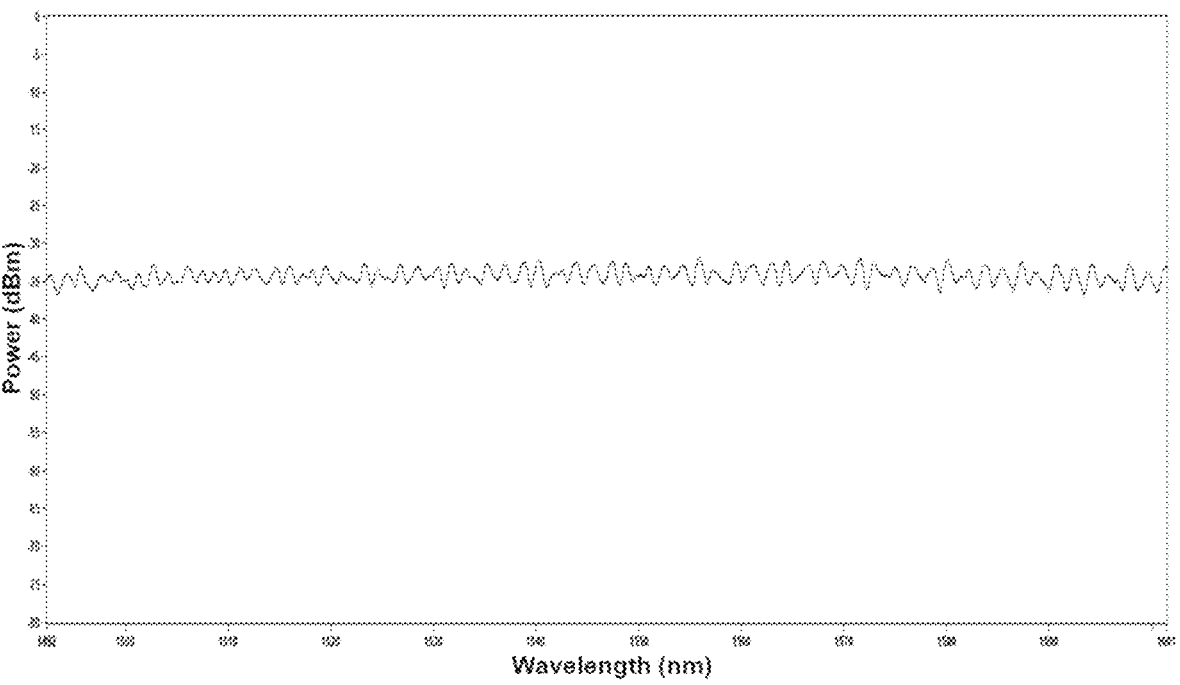
FIG. 3A shows an example light signal reflected by a multi-mode cable of an RTU and across a single-mode fiber optic cable captured by an interrogator when there was no movement of these components, in accordance with one or more embodiments.
Figure 3B:
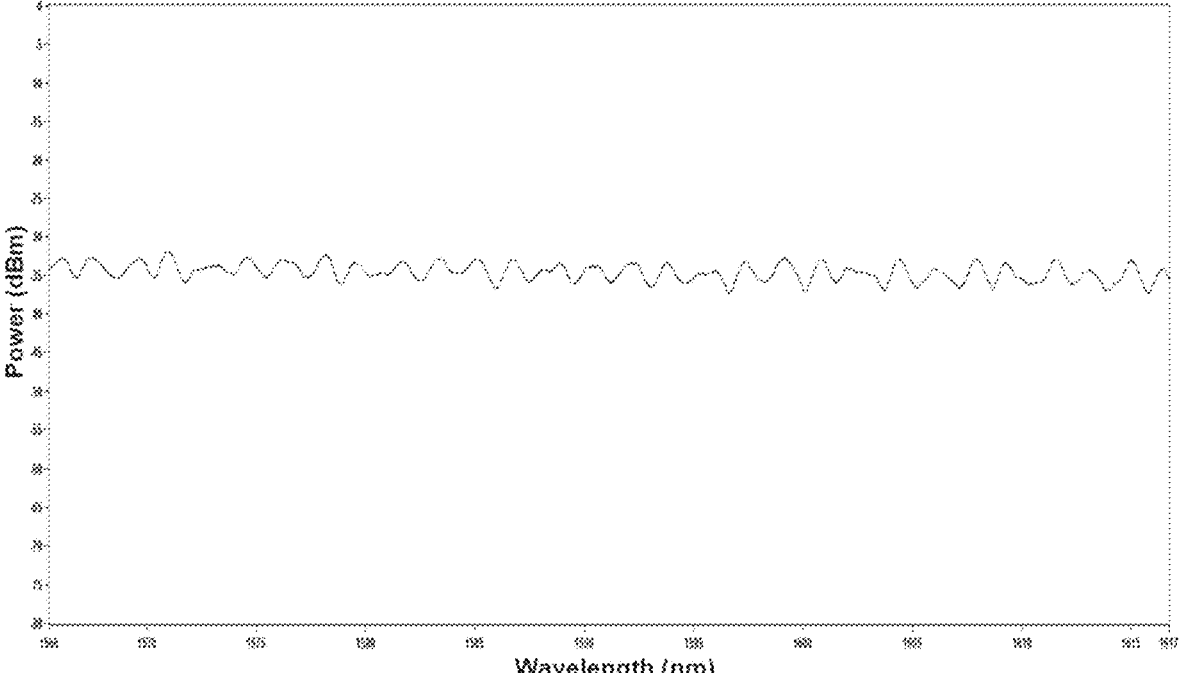
FIG. 3B shows a portion of the example signal shown in FIG. 3A by zooming in, in accordance with one or more embodiments.
Figure 3C:
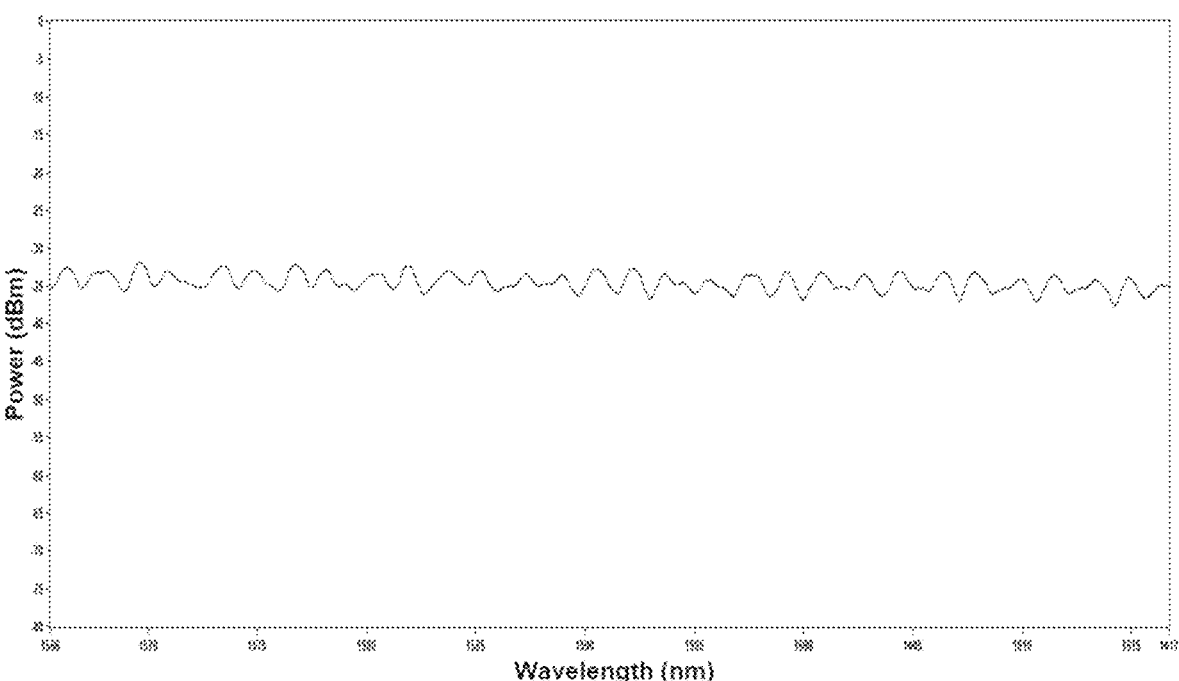
FIG. 3C shows a portion of an example signal similar to that shown in FIG. 3B but captured when there was a movement related to these components, in accordance with one or more embodiments.
Figure 3D:
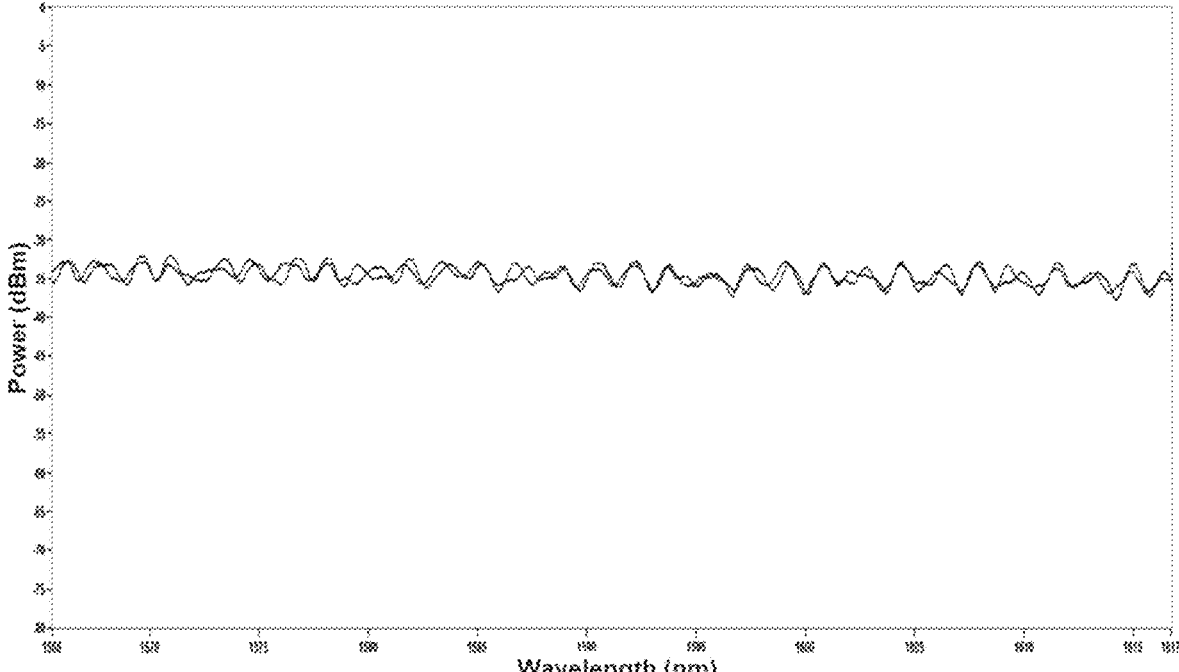
FIG. 3D shows an overlay of the signals shown in FIGS. 3B and 3C, in accordance with one or more embodiments.

FIG. 3A shows an example light signal reflected by a multi-mode cable of an RTU detected by an example interrogator when there was no movement of these components, in accordance with one or more embodiments. The wavelength range of the detected light signal illustrated in FIG. 3A is between 1492 nanometers and 1601 nanometers. The wavelength range of the light reflected by the RTU may (substantially) coincide with or exceed the wavelength range of the detected light signal shown in FIG. 3A. FIG. 3B shows a portion of the example signal in FIG. 3A by zooming in on the example signal. The wavelength range of the detected light signal illustrated in FIG. 3B is between 1566 nanometers and 1617 nanometers. FIG. 3C shows a portion of an example signal similar to that shown in FIG. 3B but captured when there was a movement related to at least one of these components, in accordance with one or more embodiments. FIG. 3D shows an overlay of the signals shown in FIGS. 3B and 3C, showing that a movement related to at least one of these components may cause a detectable change in the light signal.

In some embodiments, interrogator 202 may be configured to emit a light signal across cable 204 dedicated for monitoring purposes. In some embodiments, no dedicated light signal is employed, and monitoring may be performed based on light signals configured to transmit data. As illustrated in FIG. 2E, interrogator 202 may be arranged in an enclosure 212. In some embodiments, interrogator 202 may be a modular device (e.g., a card or other device).

Figure 2B:
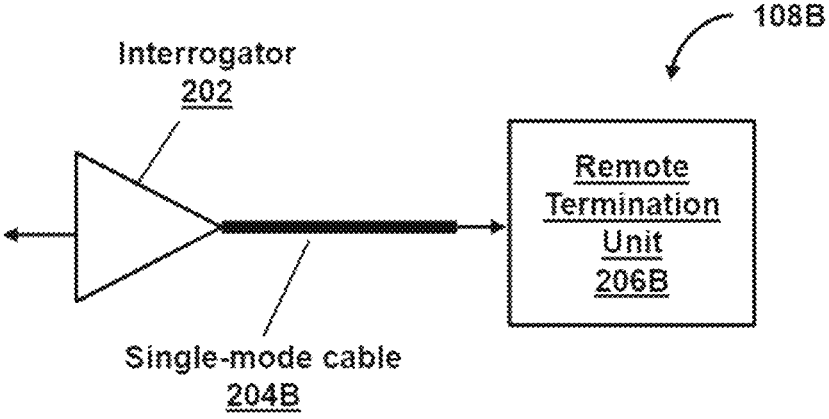
Figure 2C:
Figure 2C:
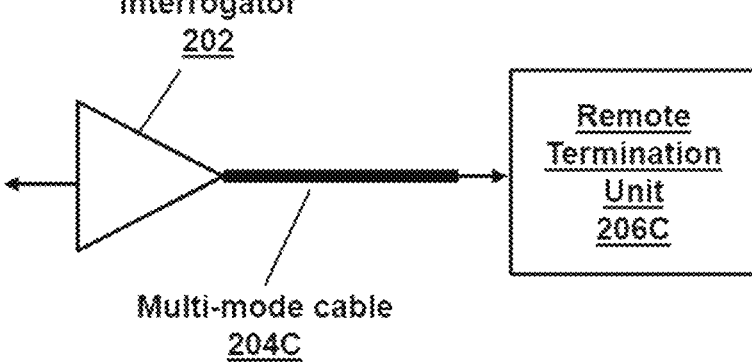
Figure 2D:
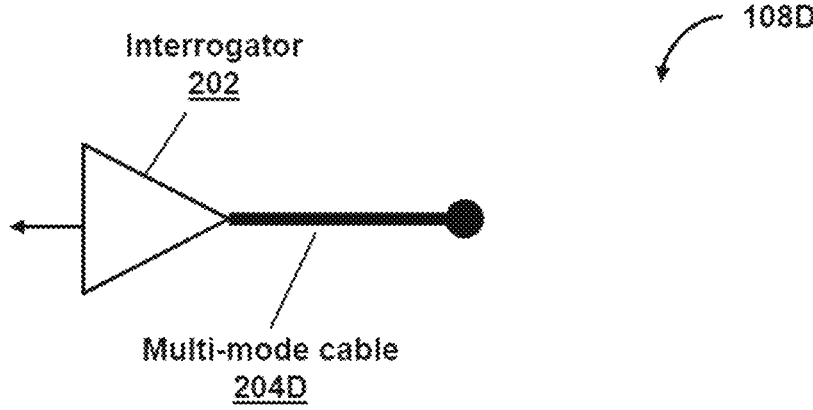
Figure 2E:
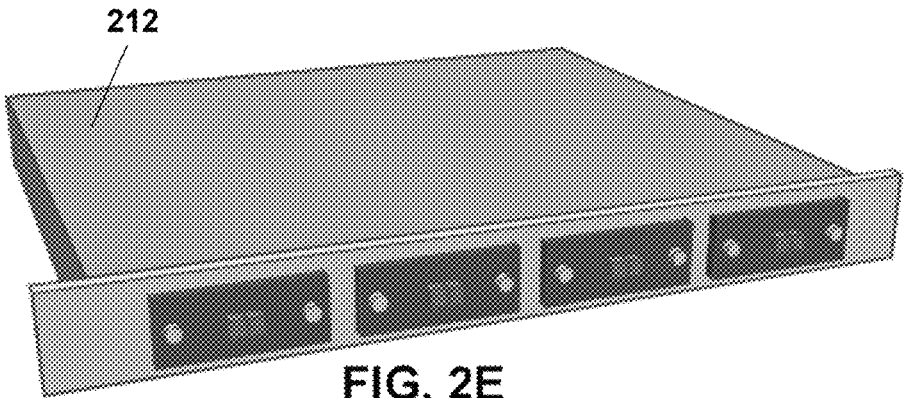

Cable 204 may be single-mode (e.g., cable 204B as illustrated in FIG. 2B) or multi-mode (e.g., cable 204C as illustrated in FIG. 2C, or cable 204D as illustrated in FIG. 2D). In some embodiments, cable 204 may be configured to transmit data and also transmit light signals for monitoring purposes. In some embodiments, cable 204 may be a dedicated cable for transmitting light for monitoring purposes. Cable 204 may be operably connected to interrogator 202 such that cable 204 may receive and transmit light from interrogator 202 or transmit light to interrogator 202. For example, at least a portion of light reflected across cable 204 may impinge upon and be detected by interrogator 202.

Figure 2F:
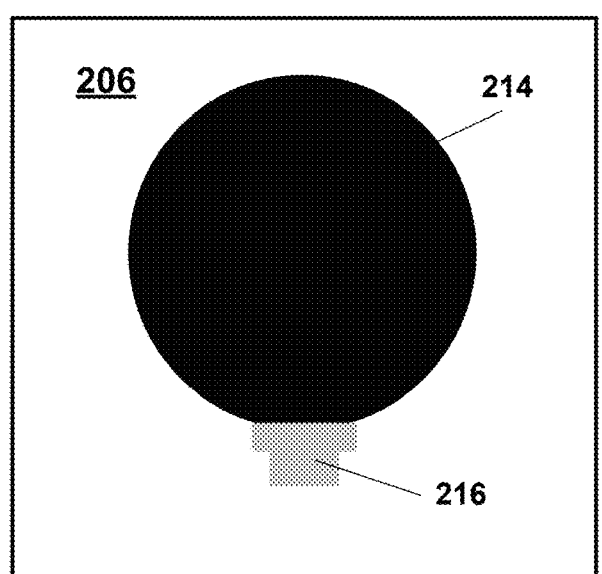
Figure 2F:
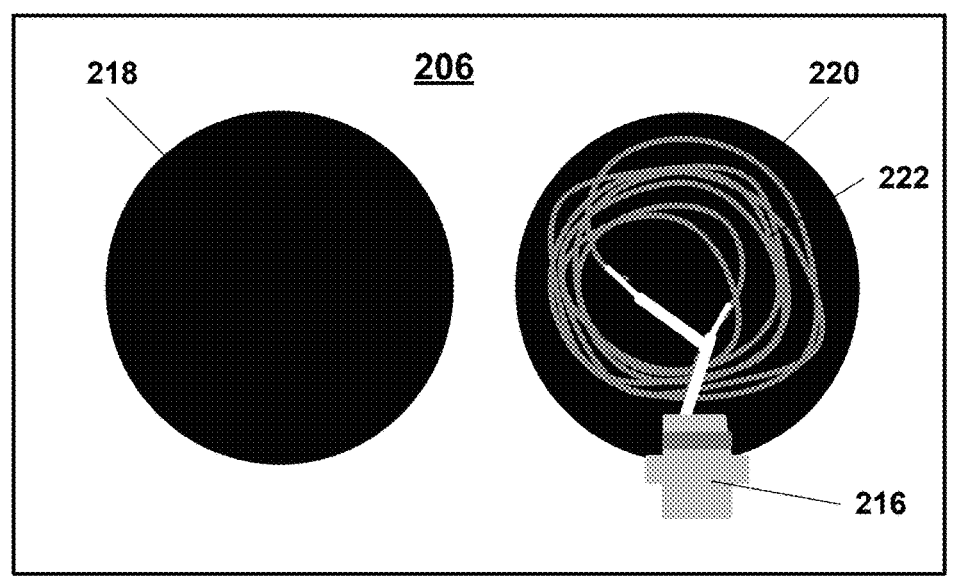

RTU 206 may include a fiber optic cable (e.g., cable 222 as illustrated in panel II of FIG. 2F) coiled in a housing (e.g., housing 214 as illustrated in panel I of FIG. 2F). Housing 214 may include cover 218 and cable holder 220, as illustrated in panel II of FIG. 2F. Cable 222 may be coiled within housing 214. Depending on one or more factors (e.g., the dimension of housing 214, the length of cable 222, the material of cable 222, etc.), cable 222 may be coiled in one or multiple coils within housing 214. As an example, cable 222 may be coiled in six or more coils within housing 214. As another example, cable 22 may be coiled in one, two, four, five, eight, ten, or more coils within housing 214. In some embodiments, the coil count of the coils of cable 222 may relate to the intensity of light reflected by cable 222. As an example, the coils may increase the intensity of the reflected light, and therefore make changes in the reflected light more noticeable, thereby improving the sensitivity or overall performance of system 100. In some embodiments, RTU 206 may include cable 222 without coils. Cable 222 may be single-strand containing one core or multi-strand containing multiple cores.

Cable 222 may be of a different mode than cable 204 such that light coming from cable 204 may bounce around in cable 222 of RTU 206 and be reflected back into cable 204, which in turn may be reflected across cable 204 and detected by interrogator 202. Cables of different modes may have different characteristics, such as differences in core size, material, etc. For instance, cable 204 may have a first cable core size, and cable 222 may have a second cable core size different from the first cable core size. As another example, cable 204 may have a first material makeup, and cable 222 may have a second material makeup different from the first material makeup.

As an example, with respect to interrogation system 108B illustrated in FIG. 2B, cable 222 in RTU 206B may be a multi-mode cable, while cable 204B may be a single-mode cable. A single-mode cable is configured to propagate a single light mode, whereas a multi-mode cable is configured to allow propagation of multiple simultaneous light modes. Compared to a multi-mode cable, a single-mode cable usually has a smaller core diameter, a lower bandwidth, and less light dispersion. Due to these and other differences, coupling of a single-mode cable with a multi-mode cable may cause signal distortion and loss, undesirable in data transmission. However, as illustrated in the present disclosure, when a multi-mode cable is passively coupled to a single-mode cable (e.g., at an end of the single-mode cable) the change in the core size may create an environment where light coming from the single-mode cable is reflected at a variety of wavelengths in the multi-mode cable.

Light reflection in the multi-mode cable may depend on or relate to intrinsic parameters (e.g., the core size, the material, the length of the multi-mode cable, etc.) or extrinsic parameters (e.g., the diameter of a coil, number of coils, etc.), curvature of a portion of the cable), relative positions of various portions of the coils of the multi-mode cable, etc.). While an intrinsic parameter may be set for a multi-mode cable, an extrinsic parameter may change by an activity directed to or in the vicinity of the multi-mode cable.

The reflected light from the multi-mode cable may further enter the single-mode cable (e.g., to which the multi-mode cable is passively coupled) and be reflected across the single-mode cable so as to be detected by one or more sensors (e.g., interrogator 202) operably coupled to the single-mode cable. Similar to a multi-mode cable, light reflection in the single-mode cable may depend on or relate to intrinsic or extrinsic parameters of the single-mode cable. Also similar to a multi-mode cable, while an intrinsic parameter may be set for a single-mode cable, an extrinsic parameter may change by an activity related to (e.g., directed to or in a vicinity of) the single-mode cable. Accordingly, light reflected by cable 222 in RTU 206B and across cable 204B may carry information regarding intrinsic parameters and extrinsic parameters of the multi-mode and single-mode cables.

By teasing out information associated with intrinsic parameters of the multi-mode cable and of the single-mode cables, information associated with extrinsic parameters (e.g., one or more activities related to the multi-mode cable or the single-mode cables) may be detected based on the reflected light. As an example, reflected light detected in a calibration phase may be used to represent a baseline or reference state of cable 204B, while a change in the reflected light detected in an operation phase (e.g., a change relative to or determined based on the reflected light detected in the calibration phase) may indicate one or more activities related to cable 204B (e.g., FIGS. 3A-3D and relevant description thereof).

FIG. 2C shows another example of interrogation system 108C including a multi-mode cable 204C to be monitored. Interrogation system 108C may include interrogator 202 and RTU 206C operably coupled to opposite ends of cable 204C. RTU 206C may include at least one FBG sensor (e.g., a single FBG sensor) configured to provide a reference reflected light. Multi-mode cable 204C may generate reflected light (e.g., with minimal length). Interrogator 202 may detect both the reference reflected light generated by RTU 206C and the light reflected across cable 204C, thereby facilitating the detection of an activity (e.g., a cut or damage) related to cable 204C. On the other hand, as illustrated in FIG. 2D, without an RTU (e.g., RTU 206C) operably coupled to an end of multi-mode cable 204D (similar to multi-mode cable 204C), system 100 may be unable to accurately detect an activity (e.g., a cut or damage) related to cable 204D based on light reflection that occurs in cable 204D with minimal length along cable 204D (e.g., due to a lack of a reference reflected light).

RTU 206 may be operably coupled to cable 204 via connector 216. Connector 216 may be an angled physical contact (APC) connector, or an ultra physical contact (UPC) connector. As an example with respect to FIG. 2B, RTU 206B includes multi-mode cable 222 that is passively coupled to single-mode cable 204B via connector 216 which is an APC connector such that the angled polishing of the APC connector may reduce the amount of the reflected light generated in cable 222 to return to cable 222, and accordingly allow more of the reflected light to re-enter cable 204B and ultimately be detected by interrogator 202.

Figure 4:
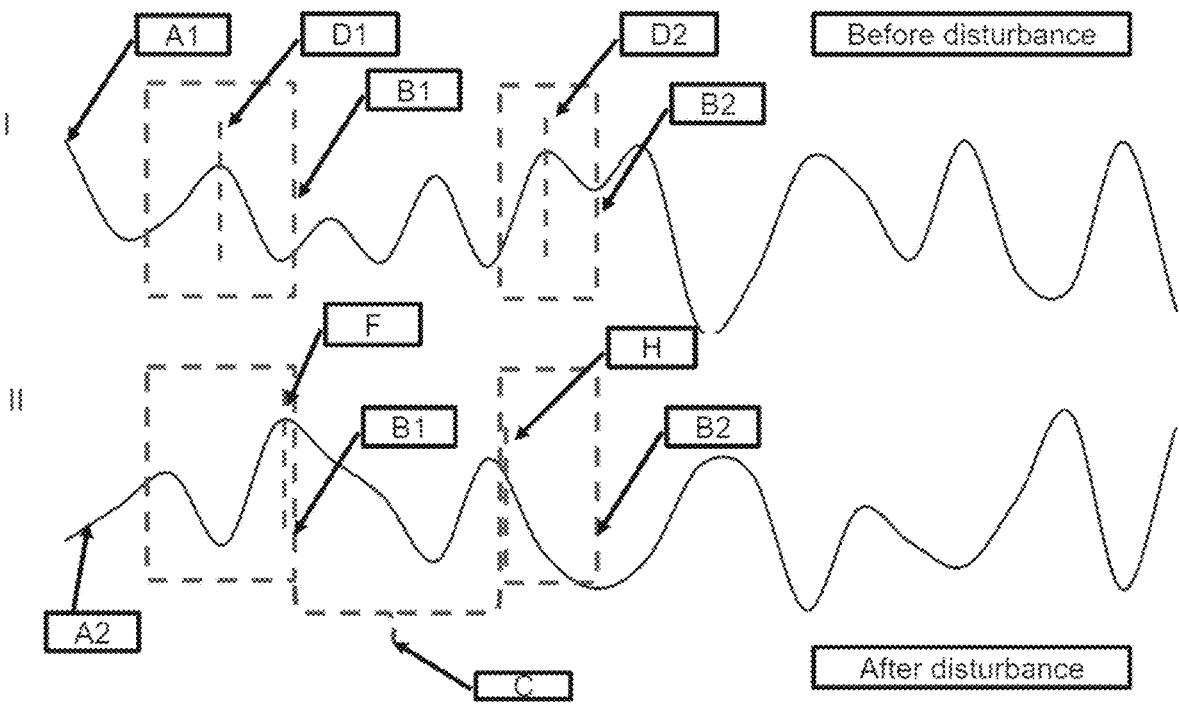
FIG. 4 shows example signals of reflected light over a wavelength range before disturbance and after disturbance, in accordance with one or more embodiments.

Referring back to FIG. 1, detection subsystem 112 may process sensor data captured during a calibration phase. As an example, the sensor data may include a wavelength range reflected by the coils of the multi-mode fiber optic cable of the remote termination unit and then reflected across the single-mode fiber optic cable during the calibration phase. Detection subsystem 112 may detect calibration intensity peaks at different wavelengths of the wavelength range. As an example, detection subsystem 112 may detect calibration intensity peaks using a threshold-based detection algorithm, by detecting local maxima that have higher intensity values than their neighbors, or via other techniques (e.g., see panel I of FIG. 4 illustrating dotted line D1 that indicates a calibration intensity peak and its corresponding wavelength in sampling window B1, and dotted line D2 that indicates a calibration intensity peak and its corresponding wavelength in sampling window B2). In some embodiments, detection subsystem 112 may pre-process the sensor data before applying the peak detection algorithm. As an example, detection subsystem 112 may pre-process the sensor data using one or more of various techniques including, for example smoothing filters (e.g., Gaussian or Savitzky-Golay) and a baseline correction algorithm.

In some embodiments, detection subsystem 112 may determine, based on the calibration intensity peaks, reference locations for sampling windows of the wavelength range so that only a portion of the wavelength range is analyzed further, thereby reducing computation resource usage (e.g., storage resource, computing resource, etc.) and processing time (and, thus, increasing the efficiency of the system). In some embodiments, the reference locations for the sampling windows are determined such that (i) each window of the sampling windows includes a corresponding wavelength of an intensity peak of the calibration intensity peaks and (ii) the sampling windows collectively do not include other wavelengths of the wavelength range between respective ones of the sampling windows of the wavelength range. As an example, for a calibration intensity peak, detection subsystem 112 may identify its corresponding wavelength within the wavelength range. Detection subsystem 112 may then determine a sampling window enclosing the corresponding wavelength. For instance, detection subsystem 112 may determine the reference locations of the sampling window by positioning the corresponding wavelength (substantially) at a center of the sampling window. As an example, for each of the sampling windows, the reference locations may include a starting point (e.g., a starting wavelength) and an endpoint (e.g., an end wavelength) of the sampling window.

In some embodiments, detection subsystem 112 may select reference locations of a sampling window based on a wavelength range threshold, a waveform of the signal within the sampling window, a distance from a neighboring sampling window, or other criteria. In some embodiments, the wavelength range threshold of a sampling window may define a minimum range of the sampling window (e.g., 2 nm, 3 nm, 5 nm, 10 nm, etc.), a maximum range of the sampling window (e.g., 5 nm, 10 nm, 20 nm, etc.), or other criteria. Based on the wavelength range threshold, the reference locations corresponding to the starting point and the endpoint of the sampling window may be determined such that the calibration intensity peak may be positioned (substantially) at a center of the sampling window. As used herein, "substantially," when it is used to qualify a feature, indicates that a deviation from the feature is below a threshold. As an example, "substantially," when it is used here to qualify the feature "at a center of a sampling window," indicates that a deviation of the wavelength corresponding to the calibration intensity peak in a sampling window from the center of the wavelengths enclosed in the sampling window is below a threshold (e.g., 20%, 10%, 5%, or other percentage of the width of the sampling window).

In some embodiments, detection subsystem 112 may determine reference locations of a sampling window based on the waveform of the signal within the sampling window. For example, detection subsystem 112 may determine reference locations of a sampling window such that on one side (e.g., the left side) of the sampling window (where the wavelengths are smaller than the wavelength corresponding to the calibration intensity peak of the sampling window), the amplitudes of the signal increase (substantially) monotonically (e.g., the portion of the signal to the left of the dotted line D1 in sampling window B1 and the portion of the signal to the left of the dotted line D2 in sampling window B2 in panel I of FIG. 4), while on the other side (e.g., the right side) of the sampling window (where the wavelengths are larger than the wavelength corresponding to the calibration intensity peak of the sampling window), the amplitudes of the signal decrease (substantially) monotonically (e.g., the portion of the signal to the right of the dotted line D1 in sampling window B1 and the portion of the signal to the right of the dotted line D2 in sampling window B2 in panel I of FIG. 4).

Additionally, or alternatively, detection subsystem 112 may determine reference locations of sampling windows based on a spacing threshold such that each sampling window of the sampling windows is separated by at least the spacing threshold from a next sampling window of the sampling windows closest to the sampling window. In one use case, a spacing threshold may be 4 nm, 6 nm, 10 nm, 20 nm, or another spacing amount. The spacing threshold may be user-defined, automatically derived from wavelength ranges of one or more prior sampling windows (e.g., 1×, 2×, 3×, or other multiple of the range of the immediately prior sampling window or of an average of two or more prior sampling windows, a multiple of an output derived from the range of the immediately prior sampling window or of an output derived from an average of two or more prior sampling windows, etc.).

As an example, for a first sampling window and a second sampling window next to each other where the starting position (wavelength) of the first sampling window is smaller than the starting position (wavelength) of the second sampling window, detection subsystem 112 may determine the distance between the two sampling windows based on a distance between an end location of the first sampling window (e.g., the maximum wavelength in the first sampling window) and a start location of its neighbor sampling window on the right (e.g., the minimum wavelength in the second sampling window) (see, e.g., spacing C between sampling windows B1 and B2 next to each other as illustrated in FIG. 4). As another example, for two sampling windows next to each other, detection subsystem 112 may determine the distance between the two sampling windows based on a distance between the wavelengths corresponding to the calibration intensity peaks in the respective sampling windows.

As a further example, for two sampling windows next to each other, detection subsystem 112 may determine the distance between the two sampling windows based on a distance between corresponding locations (e.g., start locations, end locations) of the sampling windows. Detection subsystem 112 may determine the reference locations of the two sampling windows next to each other such that the distance between the two sampling windows is no less than the spacing threshold. Detection subsystem 112 may determine the reference locations of the two sampling windows next to each other such that the two sampling windows do not overlap. In this way, the sampling windows collectively do not span the entire wavelength range reflected by RTU 206 or the entire wavelength detectable by one or more sensors. In some embodiments, the spacing threshold may be set based on a user instruction. The spacing threshold may improve performance of system 100 by avoiding concentration of sampling windows over a narrow portion of the wavelength range and ensuring a sufficient portion of the wavelength range is sampled without increasing the number (count) of the sampling windows and without increasing the computation resource usage or processing time.

In some embodiments, at least two of the sampling windows may have different window widths. A different number of wavelengths may be sampled in a window than at least one other window of the sampling windows. As an example, a first sampling window may encompass wavelengths between 1500 nanometers and 1520 nanometers, in which 10 wavelengths may be sampled for every 2 nanometers; a second sampling window may encompass wavelengths between 1550 nanometers and 1580 nanometers, in which 15 wavelengths may be sampled for every 2 nanometers; accordingly, the first and second sampling windows may have different window widths (a window width of 20 nanometers for the first sampling window and a window width of 30 nanometers for the second sampling window), and a different number of wavelengths may be sampled in the first sampling window than the second sampling window.

In some embodiments, in the calibration phase, detection subsystem 112 may detect local intensity extrema (e.g., local intensity peaks, local intensity valleys) at different wavelengths of a wavelength range reflected across a first cable of a first mode (e.g., cable 204 as illustrated in FIG. 2A, single-mode cable 204B as illustrated in FIG. 2B, and multi-mode cable 204C as illustrated in FIG. 2C), in which the wavelength range is reflected by a second cable of a second mode (e.g., multi-mode cable of RTU 206B as illustrated in FIG. 2B, multi-mode cable 222 of RTU 206 as illustrated in FIGS. 2A and 2E. RTU 206C as illustrated in FIG. 2C). As an example, detection subsystem 112 may detect local intensity extrema using a threshold-based detection algorithm, by detecting local maxima that have higher intensity values than their neighbors, by detecting local minima that have higher intensity values than their neighbors, or via other techniques. In some embodiments, detection subsystem 112 may determine, based on the local intensity extrema, reference locations for sampling windows of the wavelength range such that (i) each window of the sampling windows may include a corresponding wavelength of a local extremum of the local intensity extrema and (ii) the sampling windows collectively do not include other wavelengths of the wavelength range between at least two of the sampling windows of the wavelength range. In some embodiments, a different number of wavelengths may be sampled in a sampling window than at least another window of the sampling windows.

Compared to existing technology in which one or more peaks or valleys are identified in a signal as individual reference points for detecting a change in the signal, detection subsystem 112 may identify calibration intensity peaks or extrema to further determine sampling windows, allowing monitoring over a broader range of the signal that fall within the sampling windows, while avoiding monitoring an entire wavelength range reflected by the RTU or an entire wavelength range detected by the interrogator.

In some embodiments, system 100 may perform calibration automatically upon the start of monitoring. In some embodiments, as part of the calibration phase, system 100 may test detection capabilities. In some embodiments, after an initial calibration, system 100 may repeat calibration upon detection of a significant change to a fiber optic cable to be monitored or its surroundings, or according to a user request. In some embodiments, prior to calibration or other operations, system 100 may perform a quality assurance check or verification. In some embodiments, system 100 may check captured spectrum data for general inconsistencies or errors. For example, system 100 may check for incomplete spectrum signals lacking wavelength/power values for significant portions of the detected data. As another example, system 100 may check for incorrect spectrum data containing large amounts of positive power values at the start of the spectrum data when power values are typically expressed as a negative number. System 100 may proceed to calibration upon satisfactory quality assurance check or verification.

In some embodiments, detection subsystem 112 may store the reference locations of the sampling windows. Subsequent to storing the reference locations of the sampling windows, detection subsystem 112 may proceed to a detection phase (or referred to as an operation phase) and monitor cable 204 (e.g., cable 204B as illustrated in FIG. 2B, cable 204C as illustrated in FIG. 2C) based on the reference locations of the sampling windows, not the entire wavelength range reflected by RTU 206 (e.g., RTU 206B as illustrated in FIG. 2B, RTU 206C as illustrated in FIG. 2C), and not the entire wavelength range detected by interrogator 202, thereby reducing computation resource usage or processing time. As an example, interrogator 202 may detect at least a portion of the light reflected across cable 204B, and filter, based on the reference locations for the sampling windows, the detected light to obtain filtered light data that excludes wavelengths outside of the sampling windows. As another example, interrogator 202 may detect at least a portion of the light reflected across cable 204B, and detection subsystem 112 may extract portions of the detected light, based on the reference locations for the sampling windows, to obtain filtered light data that excludes wavelengths outside of the sampling windows.

In some embodiments, detection subsystem 112 may obtain light detected by one or more sensors (e.g., reflected light detected by interrogator 202) and filter the detected light based on the reference locations for the sampling windows to obtain filtered light data that excludes wavelengths outside of the sampling windows. In one use case, the reference locations for a first sampling window may be starting and ending locations 1566 nm and 1568 nm, the reference location for a second sampling window may be starting and ending locations 1574 nm and 1577 nm, the reference location for a second sampling window may be starting and ending locations 1583 nm and 1585 nm, and so on. As such, where the spacing threshold is 6 nm, the filter light data may include wavelengths 1566-1568 nm, 1574-1577 nm, and 1583-1585 nm and their respective amplitudes, but excludes wavelengths 1569-1573 nm, 1578-1582 nm, and 1586-1580 nm.

In some embodiments, detection subsystem 112 may determine one or more activities related to cable 204 based on the filtered light data. In some embodiments, such activities may include one or more activities related to one or more cables to be monitored, such as a cable cut, human-perceivable movement, or non-oscillating movement and oscillating motion (e.g., vibrations). As an example, a cable cut may correspond to a significant signal loss (e.g., a significant decrease in the signal intensity or power level). In some use cases, a signal loss detected may be due to a cable cut or another event (e.g., malfunction of the RTU, power outage of system 100, etc.). As another example, movement of a fiber optic cable may correspond to tampering of the fiber optic cable, tampering of the RTU operably coupled to the fiber optic cable (e.g., at an end of the fiber optic cable), or human-movement of components or other activities that cause human-perceivable moveable. As a further example, vibrations may correspond to someone or something (e.g., a person, a tool maneuvered by a person or a robot, or an animal) approaching the fiber optic cable, constituting a precursor of the fiber optic cable being tampered or damaged. Merely by way of example, vibration may correspond to minor signal changes within the sampling windows, whereas movements may correspond to more significant changes (e.g., inversions of the peaks to valleys or significant changes to the "shape" of the waveforms within the sampling windows).

In some embodiments, detection subsystem 112 may determine such activities via a prediction model. As an example, the prediction model may be configured to generate a prediction based on the signal reflected across the fiber optic cable to be monitored (e.g., filtered light data falling within sampling windows). In some embodiments, the prediction model may output a binary result indicating whether an activity (e.g., a disturbance activity) related to the fiber optic cable is detected or not. In some embodiments, the prediction model may output a multi-class result including a specific type of activity (e.g., vibration, movement, or unknown) related to the fiber optic cable being detected. In some embodiments, detection subsystem 112 may also include a thresholding determination configured to trigger one or more different downstream actions (e.g., generating alerts about a detected activity, shutting down data transmission through the fiber optic cable where the activity is detected, or performing other actions).

In some embodiments, the prediction model may be based on spectrum fingerprint tracking. That is, the signal reflected across a fiber optic cable to be monitored may remain (substantially) unchanged unless an activity related to the fiber optic cable has occurred, and an activity related to the fiber optic cable may lead to a detected change in the signal reflected across a fiber optic cable to be monitored. Accordingly, the signal reflected across a fiber optic cable may be monitored, and a change thereof may indicate the occurrence of an activity related to the fiber optic cable. In some embodiments, to reduce the computation resource usage or processing time, the monitoring may be performed based on reference locations of sampling windows determined as described elsewhere in the present disclosure, thereby avoiding monitoring over an entire wavelength range reflected across the fiber optic cable or over an entire wavelength range detected by the interrogator.

As an example, the prediction model may include calibration waveforms within the sampling windows. In some embodiments, the prediction model may include at least one analytic model that defines the calibration waveforms. In some embodiments, the prediction model may include discrete data pairs that conform to the calibration waveforms. Each of the data pairs may include a signal intensity and its corresponding wavelength. In some embodiments, the prediction model may include at least one curve representing the calibration waveforms. In some embodiments, detection subsystem 112 may monitor portions of the signal reflected across the fiber optic cable within the sampling windows captured during a detection phase by inputting the portions of the signal falling within the sampling windows into the prediction model. According to the prediction model, the portions of the signal falling within the sampling windows may be compared with the calibration waveforms within the sampling windows. The comparison may be performed at one or multiple wavelengths within each sampling window to provide a deviation value for that sampling window (e.g., an average or a maximum of the deviation values corresponding to multiple wavelengths within the sampling window).

In some embodiments, detection subsystem 112 may detect an activity related to the fiber optic cable based on a deviation of the portions of the signal within the sampling windows from the calibration waveforms within the sampling windows. The deviation may be presented in the form of an absolute value (e.g., a difference between the signal amplitude and the calibration amplitude at corresponding wavelengths within a sampling window), a percentile, or other value. For instance, for each portion of the portions of the signal that respectively fall within the sampling windows, detection subsystem 112 may determine percentage differences between wavelength intensities within the portion of the signal and baseline wavelength intensities of the calibration waveform for the sampling window corresponding to the portion of the signal, and detect, via the prediction model, based on the percentage differences, the activity related to the cable. In some embodiments, the occurrence of the activity may correspond to an average of the changes of the sampling windows exceeding a threshold, or the number (or count) of sampling windows in which the changes exceed the threshold respectively, etc.

As an example, FIG. 4 illustrates an example of activity detection via a prediction model that is based on a spectrum fingerprinting tracking technique. As illustrated in panel I of FIG. 4, in a calibration phrase, detection subsystem 112 may receive sensor data corresponding to light signal A1 over a wavelength range reflected by an RTU and across a fiber optic cable to be monitored. The X (or horizontal) axis of signal A1 is the wavelength (e.g., in nanometers), and the Y (or vertical) axis of signal A1 is signal intensity (or amplitude, power) (e.g., in dBm). Detection subsystem 112 may determine calibration intensity peaks of the reflected light A1 including the calibration intensity peak as indicated by dotted line D1 and dotted line D2, and reference locations of sampling windows B1 and B2 based on the calibration intensity peaks, respectively. The sampling windows B1 and B2 may be separated from each other by a spacing C that is no less than a spacing threshold. Detection subsystem 112 may store the reference locations of sampling windows B1 and B2. In a detection phase (or referred to as an operation phase), detection subsystem 112 may monitor light reflected by the RTU and across a fiber optic cable based on the reference locations of sampling windows B1 and B2. Detection subsystem 112 may detect, via a prediction model, based on the monitoring, an activity related to the fiber optic cable. As shown in panel II of FIG. 4, within sampling window B1, the intensity peak has moved from the location (wavelength) denoted by D1 in the calibration phase to F in the detection phase. At or in a vicinity of the wavelength corresponding to D1, the signal intensity shows a valley in the detection phase. Within sampling window B2, the intensity peak has moved from the location (wavelength) denoted by D2 in the calibration phase to H in the detection phase. Accordingly, detection subsystem 112 may determine that an activity related to the fiber optic cable has occurred. That is, the reflected light A2 in panel II of FIG. 4 corresponds to a status of the fiber optic cable after an activity (e.g., a disturbance) related to the fiber optic cable has occurred. The X (or horizontal) axis of signal A2 is the wavelength (e.g., in nanometers), and the Y (or vertical) axis of signal A2 is the signal intensity (or amplitude, power) (e.g., in dBm).

In some embodiments, the prediction model may include a machine learning model. As an example, the prediction model may include multiple machine learning model components each corresponding to a sampling window. In some embodiment, detection subsystem 112 may input filtered light data falling within sampling windows to respective machine learning model components of corresponding sampling windows. In some embodiments, detection subsystem 112 may input filtered light data falling within sampling windows acquired at different times to respective machine learning model components of corresponding sampling windows to determine whether an activity related to the fiber optic cable is detected based on a series of output from the machine learning model components corresponding to these different times.

In some embodiments, the machine learning model (e.g., each of the machine learning model components) may include two-tier detections, machine-learning-based anomaly detection, and a machine-learning-based classification. As an example, detection subsystem 112 may utilize the machine-learning-based anomaly detection to monitor the change in the portion of the filtered light signal for each sampling window and when an anomaly is detected, may forward the filtered light signal to the machine-learning-based classification to label the anomaly (corresponding to an activity related to the fiber optic cable to be monitored) for classification. In some embodiments, the machine-learning-based classification may provide a binary result indicating whether an activity (e.g., a disturbance activity) is detected or not. In some embodiments, the machine-learning-based classification may provide a multi-class result indicating a specific type of activity (e.g., vibration, movement, or unknown) is detected based on changes across the sampling windows.

In one use case, the prediction model may include a convolution neural network (CNN). Detection subsystem 112 may obtain or convert a light signal reflected across a fiber optic cable to be monitored in the form of an image or image feature vectors, and input the image or image feature vectors, with or without pre-processing, into the prediction model for activity detection or classification.

As discussed, the effect of the RTU on a reflected light signal may be random or based on one or more parameters (e.g., the length of the multi-mode fiber in the RTU, other intrinsic or extrinsic parameters of the cable in the RTU, the overall state of the fiber optic cable to be monitored, etc.). This typically calls for a model specific to each cable to be monitored and the interrogation system 108 to be used.

Figure 5A:
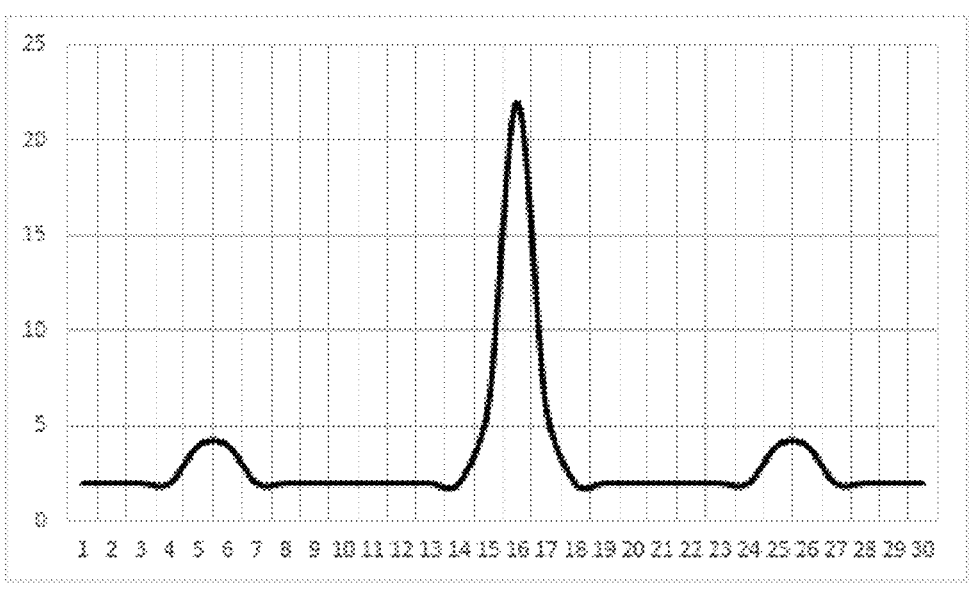
FIGS. 5A and 5B show example signals from an original reading and after scaling, respectively, in accordance with one or more embodiments.
Figure 5B:
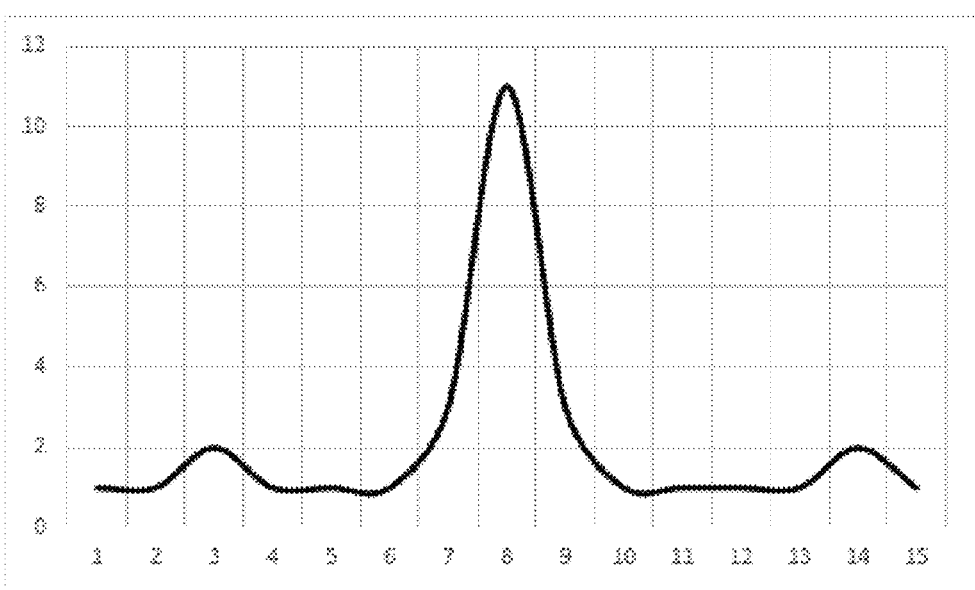

Through a variety of normalization or scaling techniques, a common machine learning model applicable to different cables to be monitored or different interrogation devices 108 to be used may be created and applied. As an example, data conversion subsystem 114 may perform difference normalization to determine the rate of change inside of a sampling window in the form of percentage values, thereby creating an automatic normalization of the rate of change to values in a predicable value range (e.g., 0 to 1, −1 to 1) that can be used in machine-learning-based anomaly detection or in classification. As another example, data conversion subsystem 114 may perform scaling on filtered light data falling within sampling windows to account for differences in window widths or reference locations of sampling windows across different fiber optic cables to be monitored or detected using different RTUs or interrogators. In a use case, data conversion subsystem 114 may perform scaling, based on one or more window size criteria, and portions of filtered light data such that the scaled portions are more similar to one another with respect to the window size criteria than before the scaling. As illustrated in FIGS. 5A and 5B, the scaled signal in FIG. 5B retains a waveform similar to the original waveform in FIG. 5A, while the wavelength range and the amplitude of the scaled signal are one-half of those of the original signal. Data conversion subsystem 114 may perform scaling according to basic scaling/matrix formulas based on respective common sampling windows so that detection subsystem 112 may input the scaled portions of the signal acquired from a specific fiber optic cable into the prediction model (e.g., respective machine learning model components) to obtain a prediction result regarding an activity related to the fiber optic cable.

In some embodiments, model subsystem 116 may train or configure one or more detection or other prediction models to facilitate one or more embodiments described herein. In some embodiments (including where one or more interrogators 202 are used to capture a light signal reflected across a fiber optic cable), machine learning techniques may be used in one or more embodiments to detect anomalies or perform classification. In some embodiments, the prediction models may include supervised or unsupervised machine learning models. In some embodiments, the prediction models may include reinforced learning models (e.g., continuously updated via a continuous learning process). As an example, model subsystem 116 may facilitate a feedback loop process that provides options for the upstream system or user to provide classification information (e.g., labels) that can be used by model subsystem 116 to better classify events in the future or add support for new event types. The model training or configuration may be performed online (e.g., as part of the calibration phase of an actual use case of fiber optic cable monitoring). The model training or configuration may be performed offline before an actual use case of fiber optic cable monitoring, and a trained or configured model may be stored in or accessible by detection subsystem 112 when needed.

In some embodiments, the prediction models may include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 6:
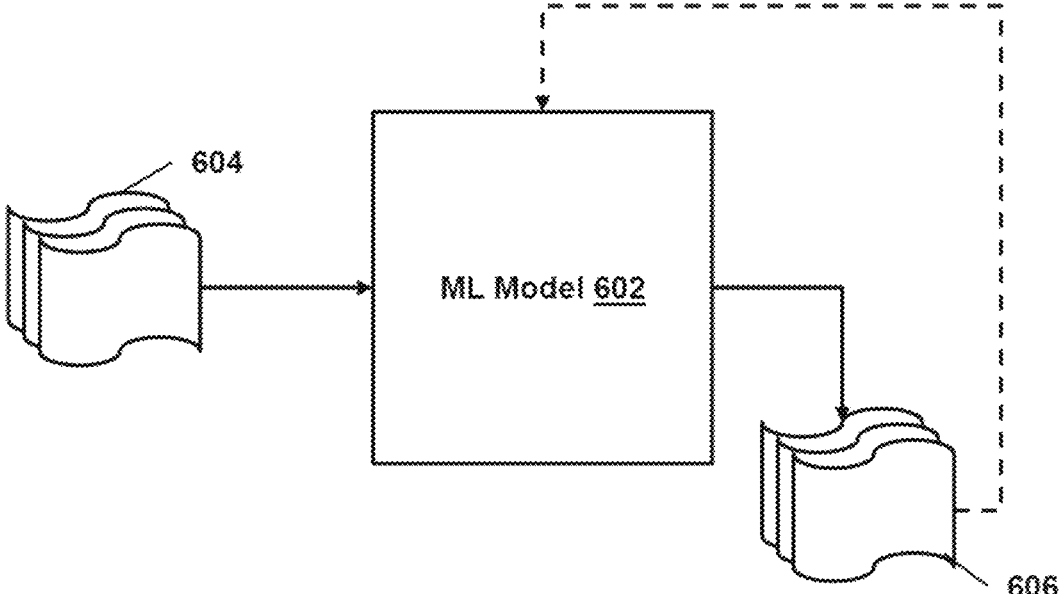
FIG. 6 shows a machine learning model configured to facilitate activity detection, in accordance with one or more embodiments.

As an example, with respect to FIG. 6, machine learning model 602 may take inputs 604 and provide outputs 606. In one use case, outputs 606 may be fed back to machine learning model 602 as input to train machine learning model 602 (e.g., alone or in conjunction with user indications of the accuracy of outputs 606, with labels associated with the inputs, or with other reference feedback information). In another use case, machine learning model 602 may update its configurations (e.g., weights, biases, or other parameters) based on its assessment of its prediction (e.g., outputs 606) and reference feedback information (e.g., user indication of accuracy, reference labels, or other information). In another use case, where machine learning model 602 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 602 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number (or count) of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bidirectional structure, forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, model subsystem 116 may associate events (or other activities) to specific times and based on user-initiated options, can observe/record these events over a defined time period (e.g., X hours, X days, X weeks, etc.) and automatically adjust the thresholds before generating and sending alerts or other event notifications to one or more administrators or other users. Examples include heating and air conditioning units (HVAC), power generators, motors, vehicles, elevators, and equipment fans. In some embodiments, the types of signals that are monitored may be adjusted. As an example, model subsystem 116 may modify one or more "tuning" parameters (e.g., via user input or without any user input specifying the particular modification). Some examples of such modifications include: modifying which signals are included in determining the definition of an "activity," modifying the degree of change for each signal, modifying the weight of the degree of change for each signal, modifying the number of concurrent signals changes in X time that constitute an event, or other modifications. However, the signals that are to be included in activity detection may be modified by the user. In another use case, one or more change thresholds can be used to adjust the value at which a signal is determined to have changed a significant amount. In another use case, weighting of the degree of change could be modified to reduce the impact of one or more signals over another. As another use case, two or more signal changes within one second may be classified as an event sent to the user or upstream system.

In one use case, the prediction model may include a convolution neural network (CNN). Detection subsystem 112 may obtain or convert a light signal reflected across a fiber optic cable to be monitored in the form of an image or image feature vectors, and input the image or image feature vectors, with or without pre-processing, to the prediction model for activity detection or classification. The CNN may include an input layer, a convolutional layer, an activation function, a pooling layer, a fully connected layer, and an output layer. The input layer may be configured to receive the input data, such as an image or an audio signal, in the form of a grid or matrix. In this case, input for machine learning may be in the form of an image or image feature vectors. In some embodiments, data conversion subsystem 114 may convert a signal (e.g., filtered light data) into a set of image feature vectors.

In some embodiments, data conversion subsystem 114 may, before the conversion, pre-process each of the heterogenous signals acquired from different sets of equipment (e.g., fiber optic cables to be monitored, RTUs, interrogators, etc., from different manufacturers/brands and having different specifications), as discussed elsewhere herein (e.g., by scaling or performing other normalization techniques on the signals). In some embodiments, data conversion subsystem 114 may then convert each pre-processed signal into a set of image feature vectors to be used as input for training CNN. In the convolutional layer, local patterns, such as edges or textures, may be detected by applying convolution operations between the input and a set of filters (also known as kernels). These filters may have a smaller spatial extent than the input and slide across the input data to create feature maps that represent the presence of specific patterns. After the convolution operation, an activation function, such as a Rectified Linear Unit (ReLU), may be applied to introduce non-linearity into the network, enabling it to learn more complex patterns. The pooling layer may reduce the spatial dimensions of the feature maps, which in turn may reduce the number (or count) of parameters and computational cost while preserving information of interest. Example pooling techniques include max pooling and average pooling. After multiple convolutional and pooling layers, the feature maps may be flattened and connected to a fully connected layer. This layer may facilitate the combination of the features learned by the previous layers and make predictions based on the input data. The output layer may provide a final output of the CNN, such as a prediction of whether an activity related to the fiber optic cable is detected or classification of the activity.

In some embodiments, model subsystem 116 may train a machine learning model based on a training dataset of images or other light-derived data (e.g., filtered light emitted via a physical transmission line) to generate predictions related to one or more activities. Such training datasets may be stored in or retrieved from training database(s) 134 of prediction database(s) 132. As an example, the machine learning may be provided with an input (e.g., a signal including filtered light data detected in a calibration phase without a disturbance activity or in a detection phase with a disturbance activity) and generate the predictions as an output. As another example, each input may include filtered light data (e.g., a vector representation of the filtered light data).

As still a further example, model subsystem 116 may train or configure a prediction model based on a CNN algorithm. In this case, input for machine learning may be in the form of an image or image feature vectors. In some embodiments, data conversion subsystem 114 may convert a signal (e.g., filtered light data) into a set of image feature vectors. As an example, data conversion subsystem 114 may, before the conversion, pre-process each of the heterogenous signals acquired from different sets of equipment (e.g., fiber optic cables to be monitored, RTUs, interrogators, etc., from different manufacturers/brands and having different specifications), as discussed elsewhere herein (e.g., by scaling or performing other normalization techniques on the signals). Data conversion subsystem 114 may then convert each pre-processed signal into a set of image feature vectors to be used as input for training CNN.

In some embodiments, after obtaining filtered light data, data conversion subsystem 114 may obtain one or more vector representations related to the filtered light data (e.g., via one or more encoders). Model subsystem 116 may use one or more machine learning models to obtain one or more respective predictions (e.g., a set of predicted activities and respective confidence scores associated with the predicted activities) that are used to assess whether such activities (e.g., an intrusion event or other adverse event) occurred. In one use case, when devices (e.g., laser source, collection devices, etc.) are manufactured with similar components, have similar tolerances for filter distances and other similar characteristics, etc., a common prediction model (e.g., a common machine learning model) may be used. In this way, for example, the machine learning machines can be trained or configured with training data derived from devices (e.g., collection devices) having the same manufacturer (or a few different manufacturers), but still be usable to accurately generate predictions for data derived from devices created by a larger set of different manufacturers.

In some embodiments, prior to generating the vector representations of the filtered light data (and providing the vector representations to a machine learning model), data conversion subsystem 114 may transform the filtered light data based on a device identifier, a device type, a manufacturer identifier, or device configuration information associated with the laser source or the interrogator (e.g., used to facilitate detection of a signal of reflected light). As an example, data conversion subsystem 114 may transform signals captured by interrogators from different manufacturers such that the signals have similar waveform traits. Thus, for example, the set of devices (e.g., collection devices) from which data may be obtained (e.g., to create training datasets for machine learning machines) can be further expanded to devices from additional manufacturers and still be useable to accurately generate predictions for data derived from devices created by a larger set of different manufacturers.

In some embodiments, model subsystem 116 may provide one or more services (e.g., cloud-based services) through which new machine learning models (or updated versions thereof) may be obtained and provided to one or more users (e.g., customer systems that use such activity detection systems). In some embodiments, raw data captured by the different devices (e.g., by different manufacturers) may be obtained and used to train or configure one or more machine learning models or other prediction models. As discussed above, even when there are differences across devices and manufacturers, the raw data may be transformed into a normalized form (e.g., where the resulting images have similar focal point boundaries, locations/sizes, and similar second "outer" boundaries). This may allow contributions toward a larger or more comprehensive model that could be shared by a community of users.

As another example, data conversion subsystem 114 may pre-process heterogeneous signals including filtered light data acquired from different sets of equipment (e.g., fiber optic cables to be monitored for different intrinsic or extrinsic parameters, RTUs, interrogators, etc., from different manufacturers/brands and having different specifications). In some embodiments, data conversion subsystem 114 may pre-process such signals before being input to the machine learning, thereby allowing heterogenous signals acquired by different equipment or interrogation devices or systems to be used as training datasets. Such training datasets may be stored in training database(s) 134 of prediction database(s) 132. As discussed, normalization may determine the rate of change inside of a sampling window in the form of percentage values, thereby creating an automatic normalization of the rate of change to values in a predicable value range (e.g., 0 to 1, −1 to 1) that can be used as input for machine learning. Filtered light data falling within sampling windows may be scaled to account for differences in window widths or reference locations of sampling windows of signals of light reflected across different fiber optic cables to be monitored or detected by different equipment including different RTUs or different interrogators.

In some embodiments, a small number of common prediction models may be created. In some embodiments, the common prediction models may be stored in model database (s) 136 of prediction database(s) 132. As an example, different prediction models may be created for different spectrum sampling capabilities of interrogators (e.g., sampling capacities of wavelength ranges of 35 nm, 80 nm, or 160 nm). Such a difference in sampling capacity may limit the number (or count) of sampling windows to be monitored, which in turn may affect detection performance. As another example, different prediction models may be created for different speeds of sampling, resolution, or accuracy of the spectrum measurement of interrogators. Such differences may cause a failure to detect changes to the light signal reflected across a fiber optic cable to be monitored when the cable is handled briefly (e.g., within a time period shorter than a time interval between consecutive sampling) or a significant reduction in the degree of change measured during an activity (e.g., disturbance) related to the fiber optic cable.

In one use case, each input may be associated with a label (e.g., intrusion, cable movement, signal loss, normal activity, vibration, or other label), and the machine learning may generate a multi-class label prediction as the output. The label prediction may be fed back to the machine learning model as input along with the actual associated label (or other reference feedback) to train the machine learning model. In another use case, the machine learning model may update its configurations (e.g., weights, biases, or other parameters) based on its assessment of its prediction and the reference feedback information. In another use case, where the machine learning model is a neural network, connection weights may be adjusted to reconcile differences between the neural network's prediction and the reference feedback.

It should be noted that, in some embodiments, multiple predictions may be obtained respectively from multiple machine learning models or other non-machine-learning models. In some embodiments, each of the machine learning models and the non-machine-learning models may be trained or configured for predictions derived from different types of data (e.g., different types of disturbances, different types of events, different data formats, etc.).

In some embodiments, a first machine learning model may be trained or configured to generate predictions based on one or more types of disturbances, and a first statistical model may be trained or configured to generate predictions based on one or more event types. As an example, the first machine learning model may be trained or configured to detect human-perceivable movement or non-oscillating movement and oscillating motion (e.g., vibrations). As another example, the first statistical model may be trained or configured to detect signal loss (e.g., an absence of signal) that can be determined through simple color analysis. By using a non-machine-learning model for detections/predictions for one or more activities (e.g., in combination with machine learning models for detections/predictions for one or more other activities), computer resource usage along with the corresponding processing time may be reduced (e.g., as compared with using only machine learning models to detect all activities).

In some embodiments, system 100 may be integrated with a variety of network devices to offer alarm detection and alarm response capabilities. In some embodiments, system 100 may integrate with Passive Optical Network (PON) equipment, Optical Circuit Switch equipment, Optical Test Access Point equipment, and Network Analyzers to stop and start data flow to one or more network endpoints, re-route data flow, and record or further analyze data when alarms are detected and resolved. Additionally or alternatively, system 100 may integrate with at least one of a Network Time Protocol (NTP) for time synchronization of the hardware's operating system to other components within the overall architecture in which system 100 is deployed, Simple Mail Transport Protocol (SMTP) for system or activity notifications via email, Terminal Access Controller Access Control System (TACACS) for secure login/management of the system, or a network monitoring or security system via a protocol such as Syslog, MQTT, or Modbus. In some embodiments, system 100 may handle the coordination of tasks between dark fiber alarm monitoring devices and PON equipment through backend adapters leveraging Simple Network Management Protocol (SNMP) traps and Secure Shell (SSH) protocols. In some embodiments, system 100 may provide the ability for complete network mapping of components starting from a source Optical Line Terminal (OLT) down to an end user Optical Network Terminal (ONT).

In some embodiments, detection subsystem 112 may cause shutdown of network dataflow to one or more network endpoints proximate to a detected disturbance on a physical transmission line. As an example, detection subsystem 112 may monitor the physical information transmission line. When detection subsystem 112 has detected a disturbance on the physical information transmission line (e.g., based on techniques described herein via the collection devices 108a-108n or via one or more other sensors), detection subsystem 114 may trigger a network data flow shutdown response. As a further example, detection subsystem 114 may determine a location of the detected disturbance on the physical transmission line, and initiate shutdown of the network data flow to the network endpoints proximate to the determined location of the detected disturbance (e.g., the network endpoints within a threshold number of connections or distance of the detected disturbance). In one scenario, the initiation of the shutdown of the network data flow may include transmitting a port disabling command to a data flow control switch to disable a port associated with the network endpoints, rerouting at least a portion of the network data flow to avoid the network endpoints, or other actions.

In some embodiments, detection subsystem 112 may store activity information based on one or more criteria. Such criteria may include a user configuration (e.g., only x days of events or x number of events), physical storage capacity (e.g., disk, flash card, memory, etc.), or other criteria. Activity recording may allow the storage of activity information in the event that detection subsystem 112 is disconnected from an upstream software management system or interruptions in communications need synchronization of events with an upstream software management system.
Example Flowcharts FIG. 7 is an example flowchart of processing operations of a method 700 that enable the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In operation 702, local intensity extrema may be detected at different wavelengths of a wavelength range reflected across a first cable of a first mode. The wavelength range may be reflected by a second cable of a second mode. The first mode may be different from the second mode. As an example, the first cable of the first mode may be a single-mode cable to be monitored, while the second cable of the second mode may be a multi-mode cable. The second cable may be coiled in a housing of a remote terminal unit. The second cable may be passively coupled to the first cable, allowing light to be transmitted between the first cable and the second cable. Light coming from the first cable may be reflected by the second cable due to the second mode being different from the first mode. Reflected light from the second cable may be further reflected across the first cable, and detected by an interrogator (e.g., interrogator 202 as illustrated in FIGS. 2A-2C). As an example, the reflected light may be detected for a first time (e.g., during a calibration phase). Local intensity extrema may include local intensity peaks or local intensity valleys. Operation 702 may be performed by a subsystem that is the same as or similar to detection subsystem 112, in accordance with one or more embodiments.

In operation 704, based on the local intensity extrema, reference locations for sampling windows of the wavelength range may be determined. In some embodiments, each window of the sampling windows may include a corresponding wavelength of a local extremum of the local intensity extrema and the sampling windows collectively do not comprise other wavelengths of the wavelength range between at least two of the sampling windows of the wavelength range. In some embodiments, a different number of wavelengths are sampled in one of the sampling windows than at least another of the sampling windows. Operation 704 may be performed by a subsystem that is the same as or similar to detection subsystem 112, in accordance with one or more embodiments.

In operation 706, a signal reflected across a cable of the first mode may be monitored based on the reference locations for the sampling windows. In some embodiments, the cable being monitored may be the first cable of the first mode involved in the signal detection at the first time (e.g., during the calibration phase). In some embodiments, the cable being monitored here may be another cable of the first mode other than the first cable of the first mode involved in the signal detection at the first time (e.g., during the calibration phase). The signal reflected across the cable being monitored may be detected at a second time (e.g., in a detection phase) different from the first time. The detected signal may be filtered based on the reference locations of the sampling windows such that only portions of the signal within the sampling windows are monitored, and the other portions of the signal falling outside the sampling windows are not monitored. In this way, portions of the wavelength's range may be monitored, not an entire wavelength range reflected by the second cable, thereby reducing the computation resource usage or processing time, which in turn improves efficiency of the activity detection or fiber optic cable monitoring. In some embodiments, the reference locations of the sampling windows may be stored in one or more databases and later used in activity detection or fiber optic cable monitoring. Operation 706 may be performed by a subsystem that is the same as or similar to detection subsystem 112, in accordance with one or more embodiments.

In operation 708, via a prediction model, based on the monitoring, an activity related to the cable may be detected. As an example, the prediction model may output a binary prediction indicating whether an activity related to the cable is detected or not. As another example, the prediction model may output a multi-class prediction indicating that an activity related to the cable is detected and a type of the activity detected. In some embodiments, the prediction model may be a machine learning model or a non-machine learning model. In some embodiments, the filtered light data including portions of the wavelength range may be pre-processed before being input into the prediction model. Examples of such pre-processing may include normalization, scaling, or other pre-processing techniques, as described elsewhere herein. Operation 708 may be performed by a subsystem that is the same as or similar to detection subsystem 112 or data conversion subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: detecting local intensity extrema at different wavelengths of a wavelength range reflected across a first cable of a first mode (e.g., a single-mode cable), the wavelength range being reflected by a second cable of a second mode (e.g., a multi-mode cable coiled in a remote terminal unit passively coupled to an end of the first cable of the first mode); determining, based on the local intensity extrema, reference locations for sampling windows of the wavelength range such that (i) each window of the sampling windows comprises a corresponding wavelength of a local extremum of the local intensity extrema and (ii) the sampling windows collectively do not comprise other wavelengths of the wavelength range between at least two of the sampling windows of the wavelength range; monitoring, based on the reference locations for the sampling windows, a signal reflected across a cable of the first mode; and detecting, via a prediction model, based on the monitoring, an activity related to the cable.

2. The method of the preceding embodiment, wherein the first cable of the first mode comprises a single-mode cable, and the second cable of the second mode comprises a multi-mode cable of a remote termination unit, the multi-mode cable of the remote termination unit being passively connected to the single-mode cable.

3. The method of the preceding embodiments, wherein the first cable of the first mode has a first cable core size, and the second cable of the second mode has a second cable core size different from the first cable core size, the second cable of the second mode being (i) passively connected to the first cable of the first mode and (ii) coiled within a remote termination unit.

4. The method of the preceding embodiments, wherein the first cable of the first mode has a first cable material makeup, and the second cable of the second mode has a second cable material makeup different from the first cable material makeup, the second cable of the second mode being (i) passively connected to the first cable of the first mode and (ii) coiled within a remote termination unit.

5. The method of the preceding embodiments, wherein: monitoring the signal reflected across the cable of the first mode comprises extracting, based on the reference locations for the sampling windows, a portion of the signal that falls within the sampling windows; and detecting the activity related to the cable comprises inputting the extracted portion of the signal to the prediction model to obtain a prediction indicating the activity.

6. The method of the preceding embodiments, wherein determining the reference locations comprises determining the reference locations for the sampling windows based on the local intensity extrema and a spacing threshold such that each sampling window of the sampling windows is separated by at least the spacing threshold from a next sampling window of the sampling windows closest to the sampling window.

7. The method of the preceding embodiments, wherein determining, based on the local intensity extrema, reference locations for sampling windows of the wavelength range comprises: for each local intensity extremum of the local intensity extrema, determining the corresponding wavelength of the local intensity extremum; and determining the reference locations of a sampling window by positioning the corresponding wavelength at a center of the sampling window.

8. The method of the preceding embodiments, wherein each window of the sampling windows is a sampling of a different number of wavelengths than at least one other window of the sampling windows.

9. The method of the preceding embodiments, wherein: monitoring the signal reflected across the cable of the first mode comprises extracting, based on the reference locations for the sampling windows, portions of the signal that respectively fall within the sampling windows; and detecting the activity comprises: scaling, based one or more window size criteria, the portions of the signal such that the scaled portions are more similar to one another with respect to the one or more window size criteria than before the scaling; and detecting, via the prediction model, based on the scaled portions of the signal, the activity related to the cable.

10. The method of the preceding embodiments, wherein: monitoring the signal reflected across the cable of the first mode comprises extracting, based on the reference locations for the sampling windows, portions of the signal that respectively fall within the sampling windows; and detecting the activity comprises: for each portion of the portions of the signal that respectively fall within the sampling windows, determining percentage differences between wavelength intensities within the portion of the signal and baseline wavelength intensities for the sampling window corresponding to the portion of the signal; detecting, via the prediction model, based on the percentage differences, the activity related to the cable.

11. The method of the preceding embodiments, wherein the cable of the first mode being monitored is different from the first cable of the first mode.

12. The method of the preceding embodiments, wherein the second cable of the second mode (e.g., the multi-mode cable of the remote termination unit) is configured to have six or more coils (e.g., the multi-mode cable is coiled within the remote termination unit six or more times).

13. A tangible, non-transitory, machine-readable medium storing instructions that, when executed by a data processing apparatus, cause the data processing apparatus to perform operations comprising those of any of the foregoing method embodiments.

14. A system comprising: one or more processors; and memory storing instructions that, when executed by the processors, cause the processors to effectuate operations comprising those of any of the foregoing method embodiments.

What is claimed is:

1. A system for facilitating fiber optic cable monitoring, the system comprising:

a remote termination unit comprising a housing and a multi-mode fiber optic cable coiled within the housing, the multi-mode fiber optic cable of the remote termination unit having six or more coils and being passively coupled to a single-mode fiber optic cable that is to be monitored; and one or more processors programmed with computer program instructions that, when executed, cause operations comprising:

detecting calibration intensity peaks at different wavelengths of a wavelength range reflected across the single-mode fiber optic cable during a calibration phase, the wavelength range being reflected by the coils of the multi-mode fiber optic cable of the remote termination unit;

determining, based on the calibration intensity peaks, reference locations for sampling windows of the wavelength range such that (i) each window of the sampling windows comprises a corresponding wavelength of an intensity peak of the calibration intensity peaks, (ii) each window of the sampling windows is a sampling of a different number of wavelengths than another window of the sampling windows, and (iii) the sampling windows collectively do not comprise other wavelengths of the wavelength range between respective ones of the sampling windows of the wavelength range;

monitoring, based on the reference locations for the sampling windows, light reflected across the single-mode fiber optic cable during an operation phase without monitoring the other wavelengths of the wavelength range, the light being reflected by the coils of the multi-mode fiber optic cable of the remote termination unit; and detecting, via a prediction model, based on the monitoring, a disturbance activity related to the single-mode fiber optic cable.

2. The system of claim 1, further comprising a fiber optic controller configured to transmit a laser signal across the single-mode fiber optic cable to the remote termination unit, wherein monitoring the light reflected across the single-mode fiber optic cable comprises:

detecting, via the fiber optic controller, the light reflected across the single-mode fiber optic cable; and filtering, based on the reference locations for the sampling windows, the detected light to obtain filtered light data that excludes wavelengths outside of the sampling windows; and wherein detecting the disturbance activity comprises inputting the filtered light data into the prediction model to obtain a prediction indicating the disturbance activity.

3. The system of claim 1, wherein determining the reference locations comprises determining the reference locations for the sampling windows based on the calibration intensity peaks and a spacing threshold such that each sampling window of the sampling windows is separated by at least the spacing threshold from a next sampling window of the sampling windows closest to the sampling window.

4. The system of claim 1, wherein the remote termination unit is passively coupled to the single-mode fiber optic cable via an angled physical contact (APC) connector.

5. A method comprising:

detecting local intensity extrema at different wavelengths of a wavelength range reflected across a first cable of a first mode, the wavelength range being reflected by a second cable of a second mode;

determining, based on the local intensity extrema, reference locations for sampling windows of the wavelength range such that (i) each window of the sampling windows comprises a corresponding wavelength of a local extremum of the local intensity extrema and (ii) the sampling windows collectively do not comprise other wavelengths of the wavelength range between at least two of the sampling windows of the wavelength range;

monitoring, based on the reference locations for the sampling windows, a signal reflected across a cable of the first mode; and detecting, via a prediction model, based on the monitoring, an activity related to the cable.

6. The method of claim 5, wherein the first cable of the first mode comprises a single-mode cable, and the second cable of the second mode comprises a multi-mode cable of a remote termination unit, the multi-mode cable of the remote termination unit being passively connected to the single-mode cable.

7. The method of claim 5, wherein the first cable of the first mode has a first cable core size, and the second cable of the second mode has a second cable core size different from the first cable core size, the second cable of the second mode being (i) passively connected to the first cable of the first mode and (ii) coiled within a remote termination unit.

8. The method of claim 5, wherein the first cable of the first mode has a first cable material makeup, and the second cable of the second mode has a second cable material makeup different from the first cable material makeup, the second cable of the second mode being (i) passively connected to the first cable of the first mode and (ii) coiled within a remote termination unit.

9. The method of claim 5, wherein:

monitoring the signal reflected across the cable of the first mode comprises extracting, based on the reference locations for the sampling windows, a portion of the signal that falls within the sampling windows; and detecting the activity related to the cable comprises inputting the extracted portion of the signal to the prediction model to obtain a prediction indicating the activity.

10. The method of claim 5, wherein determining the reference locations comprises determining the reference locations for the sampling windows based on the local intensity extrema and a spacing threshold such that each sampling window of the sampling windows is separated by at least the spacing threshold from a next sampling window of the sampling windows closest to the sampling window.

11. The method of claim 5, wherein determining, based on the local intensity extrema, reference locations for sampling windows of the wavelength range comprises:

for each local intensity extremum of the local intensity extrema, determining the corresponding wavelength of the local intensity extremum; and determining the reference locations of a sampling window by positioning the corresponding wavelength at a center of the sampling window.

12. The method of claim 5, wherein each window of the sampling windows is a sampling of a different number of wavelengths than at least one other window of the sampling windows.

13. The method of claim 5, wherein:

monitoring the signal reflected across the cable of the first mode comprises extracting, based on the reference locations for the sampling windows, portions of the signal that respectively fall within the sampling windows; and detecting the activity comprises:

scaling, based on one or more window size criteria, the portions of the signal such that the scaled portions are more similar to one another with respect to the one or more window size criteria than before the scaling; and detecting, via the prediction model, based on the scaled portions of the signal, the activity related to the cable.

14. The method of claim 5, wherein:

monitoring the signal reflected across the cable of the first mode comprises extracting, based on the reference locations for the sampling windows, portions of the signal that respectively fall within the sampling windows; and detecting the activity comprises:

for each portion of the portions of the signal that respectively fall within the sampling windows, determining percentage differences between wavelength intensities within the portion of the signal and baseline wavelength intensities for the sampling window corresponding to the portion of the signal;

detecting, via the prediction model, based on the percentage differences, the activity related to the cable.

15. A non-transitory, computer-readable media storing instructions that, when executed by one or more processors, cause operations comprising:

detecting local characteristic extrema at different wavelengths of a wavelength range reflected across a first cable of a first mode;

determining, based on the local characteristic extrema, reference locations for sampling windows of the wavelength range such that (i) each window of the sampling windows comprises a corresponding wavelength of a local characteristic extremum of the local characteristic extrema and (ii) the sampling windows collectively do not comprise other wavelengths of the wavelength range between at least two of the sampling windows of the wavelength range;

monitoring, based on the reference locations for the sampling windows, a signal reflected across a cable of the first mode; and detecting, via a prediction model, based on the monitoring, an activity related to the cable.

16. The media of claim 15, wherein the wavelength range is reflected by a second cable of a second mode different from the first mode.

17. The media of claim 15, wherein the cable being monitored is different from the first cable.

18. The media of claim 15, wherein determining the reference locations comprises determining the reference locations for the sampling windows based on the local characteristic extrema and a spacing threshold such that each sampling window of the sampling windows is separated by at least the spacing threshold from a next sampling window of the sampling windows closest to the sampling window.

19. The media of claim 15, wherein:

monitoring the signal reflected across the cable of the first mode comprises extracting, based on the reference locations for the sampling windows, a portion of the signal that falls within the sampling windows; and detecting the activity related to the cable comprises inputting the extracted portion of the signal to the prediction model to obtain a prediction indicating the activity.

20. The media of claim 15, wherein:

monitoring the signal reflected across the cable of the first mode comprises extracting, based on the reference locations for the sampling windows, portions of the signal that respectively fall within the sampling windows; and detecting the activity comprises:

scaling, based on one or more window size criteria, the portions of the signal such that the scaled portions are more similar to one another with respect to the one or more window size criteria than before the scaling; and detecting, via the prediction model, based on the scaled portions of the signal, the activity related to the cable.

* * * * *